(12) United States Patent
Lai et al.

(10) Patent No.: US 8,585,229 B2
(45) Date of Patent: Nov. 19, 2013

(54) LAMP SUPPORT HAVING FILM SUPPORT AND BACKLIGHT MODULE USING THE SAME

(75) Inventors: Ching-Kun Lai, Hsin-Chu (TW); Ya-Chun Tu, Hsin-Chun (TW)

(73) Assignee: AU Optronics Corporation, Hsin-Chu (TW)

( * ) Notice: Subject to any disclaimer, the term of this patent is extended or adjusted under 35 U.S.C. 154(b) by 142 days.

(21) Appl. No.: 13/163,941

(22) Filed: Jun. 20, 2011

(65) Prior Publication Data
US 2012/0002399 A1   Jan. 5, 2012

(30) Foreign Application Priority Data

Jul. 1, 2010 (TW) .............................. 99121746 A

(51) Int. Cl.
*G09F 13/08* (2006.01)
*G09F 13/10* (2006.01)

(52) U.S. Cl.
USPC ............ 362/97.4; 362/97.1; 248/632; 349/60

(58) Field of Classification Search
USPC ........... 362/97.1, 97.4, 225, 358, 632, 23, 28, 362/29, 16, 217, 223, 227, 235, 236, 551, 362/559, 561, 257, 260, 296, 306, 307, 308, 362/310, 311, 390, 431; 411/378; 248/632, 248/188.9; 349/56, 58, 60
See application file for complete search history.

(56) References Cited

U.S. PATENT DOCUMENTS

| | | | | |
|---|---|---|---|---|
| 6,902,300 B2 * | 6/2005 | Lee | ................................ | 362/306 |
| 6,974,221 B2 * | 12/2005 | Wu et al. | ......................... | 362/29 |
| 7,128,461 B2 * | 10/2006 | Hwang | .......................... | 362/632 |
| 7,134,776 B2 * | 11/2006 | Kanatsu | ......................... | 362/561 |
| 7,163,319 B2 * | 1/2007 | Kuo et al. | ..................... | 362/306 |
| 7,325,937 B2 * | 2/2008 | Aoki et al. | .................... | 362/97.1 |
| 7,367,708 B2 | 5/2008 | Hsieh | | |
| 7,407,318 B2 * | 8/2008 | Chang | ........................... | 362/632 |
| 7,549,761 B2 * | 6/2009 | Chen | ............................ | 362/97.1 |
| 8,061,863 B2 * | 11/2011 | Min | ............................. | 362/97.4 |
| 8,104,909 B2 * | 1/2012 | Shin | ............................ | 362/97.1 |
| 8,240,866 B2 * | 8/2012 | Min | ............................. | 362/97.4 |

(Continued)

FOREIGN PATENT DOCUMENTS

| | | |
|---|---|---|
| CN | 201069502 Y | 6/2008 |
| TW | 200523628 A | 7/2005 |
| TW | I255896 | 6/2006 |
| TW | 200727026 A | 7/2007 |

OTHER PUBLICATIONS

English translation of abstract of CN 201069502 Y.
Taiwan Office Action dated May 9, 2013.

*Primary Examiner* — Anne Hines
*Assistant Examiner* — Jose M Diaz
(74) *Attorney, Agent, or Firm* — McClure, Qualey & Rodack, LLP

(57) ABSTRACT

A film support includes a pillar and a supporting unit. The pillar has an outer wall which encloses an accommodation space. The supporting unit has a supporting end and an assembly portion connected to each other, wherein the assembly portion is disposed in the accommodation space whereas the supporting end protrudes outside the pillar. The assembly portion of the supporting unit has a degree of freedom of rotation within the accommodation space and when the assembly portion rotates with respect to the pillar, the supporting end is driven to rotate with respect to the pillar.

18 Claims, 17 Drawing Sheets

(56) References Cited

U.S. PATENT DOCUMENTS

| | | | |
|---|---|---|---|
| 2002/0044437 A1* | 4/2002 | Lee | 362/31 |
| 2004/0257792 A1* | 12/2004 | Yu et al. | 362/31 |
| 2007/0127272 A1 | 6/2007 | Yang et al. | |
| 2007/0139574 A1* | 6/2007 | Ko et al. | 349/58 |
| 2010/0073906 A1 | 3/2010 | Shen | |
| 2012/0268951 A1* | 10/2012 | Li | 362/353 |

* cited by examiner

LAMP SUPPORT HAVING FILM SUPPORT AND BACKLIGHT MODULE USING THE SAME

BACKGROUND OF THE INVENTION

1. Field of the Invention

This invention relates to a lamp support for supporting films, specifically to a backlight module whose friction with the light diffusion film is reduced.

2. Description of the Prior Art

When liquid crystal display technology is applied in large displays such as liquid crystal televisions and billboards, optical sheets such as light diffusion films and prism plates may deform and cause change in size due to thermal expansions and contractions. The deformations of optical sheets may cause visible effect on the optical characteristics of large displays. Therefore, in order to solve the problem mentioned above, several conventional backlight modules are provided in the market to support the optical sheets and limit the deformation (e.g. warpage) of the optical sheets.

As FIG. 1A shows, a conventional supporting element 12 is disposed on a base 14 and two ends of the base 14 are disposed with positioning units 16. A light diffusion film is normally disposed above the conventional supporting element 12 and covered with a frame (not illustrated). During backlight module assembly and follow-up tests such as reliability tests, the conventional supporting element 12 used to support optical sheets such as light diffusion film may rub against the light diffusion film and may damage or even destroy the light diffusion film. The damage or destruction to the light diffusion film may necessitate the replacement of the film, further increasing the costs in production.

FIG. 1B is another schematic view of a conventional backlight device. As FIG. 1B shows, the conventional supporting element 12 is an elastic cone to prevent deformation in the light diffusion film 30. The conventional supporting element 12 further includes an elastic element 22 covered with a restraining element 24 and the bottom of a cone is connected to the elastic element 22 so that the cone can vibrate with respect to the restraining element 24. A plurality of lamps 20 are disposed at two sides of the supporting element 12 and covered by the frame 50. As FIG. 1B shows, although the deformation of the light diffusion film 30 is buffered by the up-down movable cone, there is still a significant chance for the cone and the light diffusion film 30 to rub against each other.

FIG. 1C is a schematic view of yet another backlight module. The conventional supporting element 12 is disposed between the light diffusion film 30 and a light reflector 40 whereas the light diffusion film 30 is disposed on top of the conventional supporting 12. In the present embodiment of the conventional backlight module, a buffer 18 is connected to both the bottom of the conventional supporting element 12 and the light reflector 40. In this way, the buffer 18 allows the conventional supporting element 12 to shake and absorb vibrations or other forces to reduce the friction between the conventional supporting element 12 and the light diffusion film 30. However, the supporting element 12 and the light diffusion film 30 mentioned above can still rub against each other to create scrapes and annoying sound.

Thus, it is desired to provide a backlight module capable of improving the problems mentioned above.

SUMMARY OF THE INVENTION

It is an objective of the present invention to provide a lamp support having a film support and a backlight module with reduced friction between the optical sheet and the lamp support.

It is another objective of the present invention to provide a lamp support having a film support and a backlight module whose cost of replacing damaged optical sheets is reduced by reducing damages on the optical sheet.

The present invention provides a film support including a pillar and a supporting unit. The pillar has an outer wall which encloses an accommodation space. The supporting unit has a supporting end and an assembly portion connected to each other, wherein the assembly portion is disposed in the accommodation space and the supporting end protrudes outside the pillar. The assembly portion of the supporting unit has a degree of freedom of rotation within the accommodation space and when the assembly portion rotates with respect to the pillar, the supporting end is driven to rotate with respect to the pillar.

In a more preferred embodiment, the accommodation space enclosed by the pillar can be formed as a spherical space, a rod-shaped space, or a cone-shaped space, or spaces with other suitable shapes. The shape of the supporting unit corresponds to the shape of the accommodation space, i.e. the supporting unit can be formed as a sphere, a rod, a cone, or other shapes. The assembly portion of the supporting unit is rotatably disposed in the accommodation, wherein the top of the outer wall of the pillar forms a mouth and the diameter of the mouth is smaller than the diameter of the sphere formed by the supporting unit for the mouth to limit the supporting unit. The depth from the mouth into the accommodation space is greater than the radius of the sphere-shaped supporting unit while the pillar is formed as a cone. In another embodiment, the assembly portion of the supporting unit is formed as a half-cone and the accommodation space is formed as a rod-shaped space corresponding to the shape of the assembly portion. The diameter of the mouth of the accommodation space is smaller than the external diameter of the bottom end of the rod-shaped assembly portion.

The present invention further provides a lamp support including a base, a plurality of lamp positioning units, and the above-mentioned film support. The lamp positioning units are disposed on the base and the film support is disposed between the lamp positioning units. The pillar of the film support is fixed on the base and the supporting unit can rotate with respect to the base.

The present invention further provides a backlight module including at least one optical sheet, a plurality of lamps, the lamp support and the film support mentioned above. The optical sheet is disposed above the lamp support and the lamps. The optical sheet mentioned above is preferably a light diffusion film, wherein the distance between the light diffusion film and the supporting end of the supporting unit is smaller than the length of a portion of the assembly portion that is within the accommodation space.

DETAILED DESCRIPTION OF THE PREFERRED EMBODIMENT

The present invention relates to a lamp support having a film support and a backlight module with reduced friction exerted on optical sheets and reduced cost of replacing damaged optical sheets, wherein the above-mentioned optical sheets refer to light diffusion films. However, in different embodiments, optical sheets may include hybrid optical films (HOF), other optical films or sheets used in other technologies. Furthermore, the above-mentioned backlight module is preferably used in laptop computers, mobile communication devices, digital cameras, flat display panels, or other electronic devices.

Figure 1A:
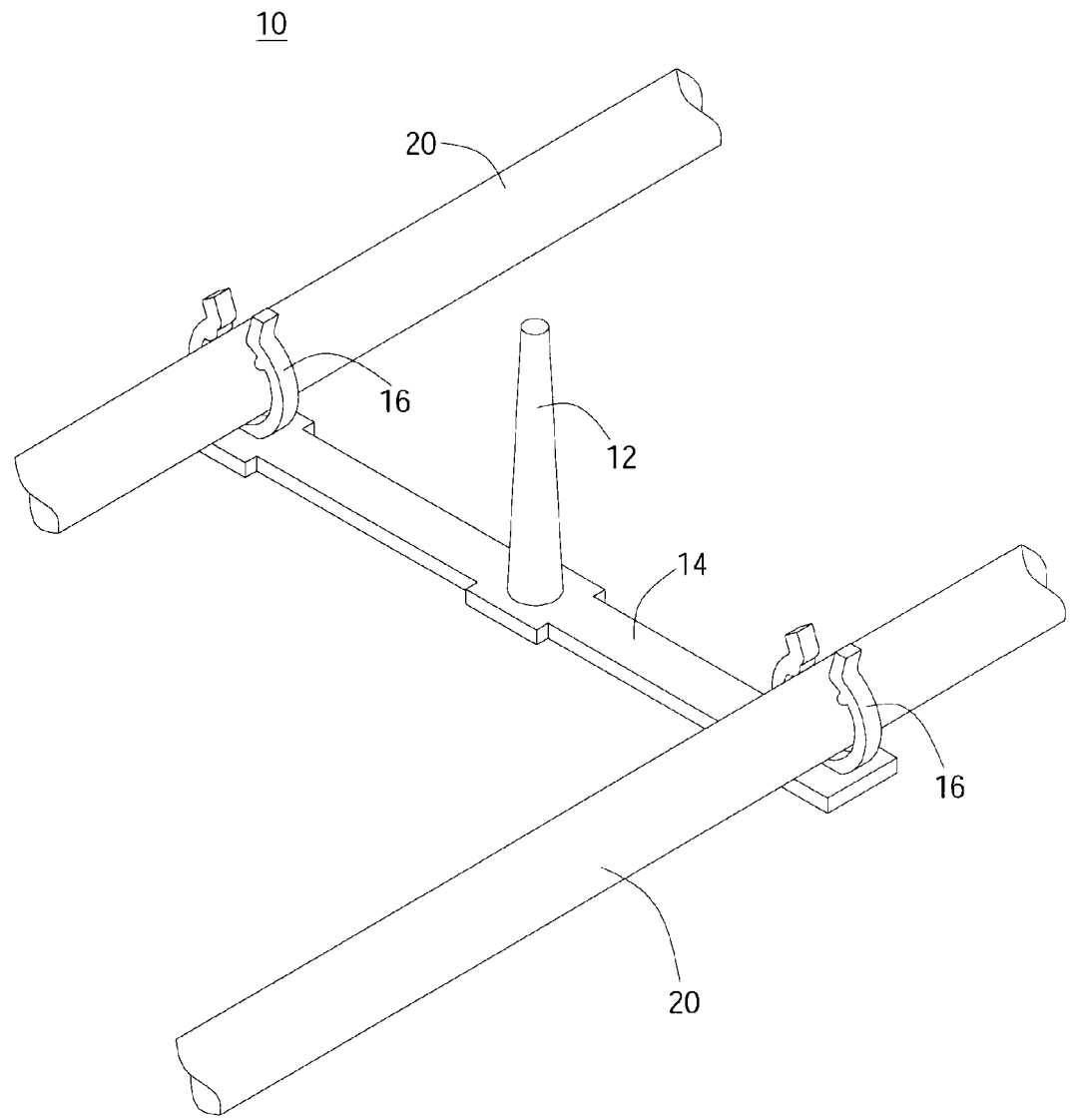
FIG. 1A is a schematic view of a conventional film support element.
Figure 1B:
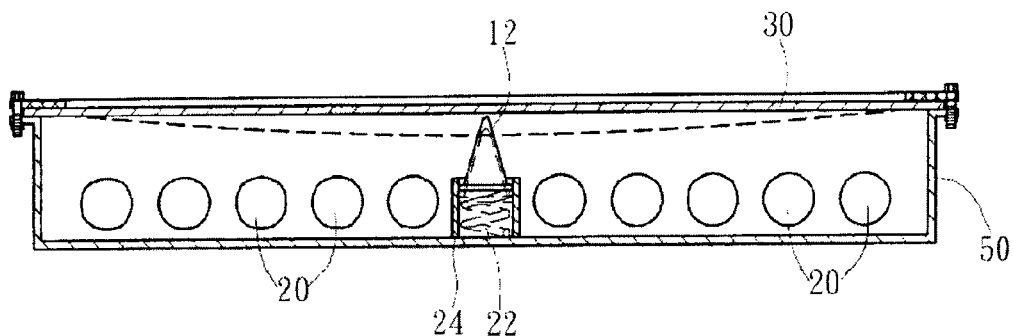
FIG. 1B is a schematic view of a conventional backlight device.
Figure 1C:
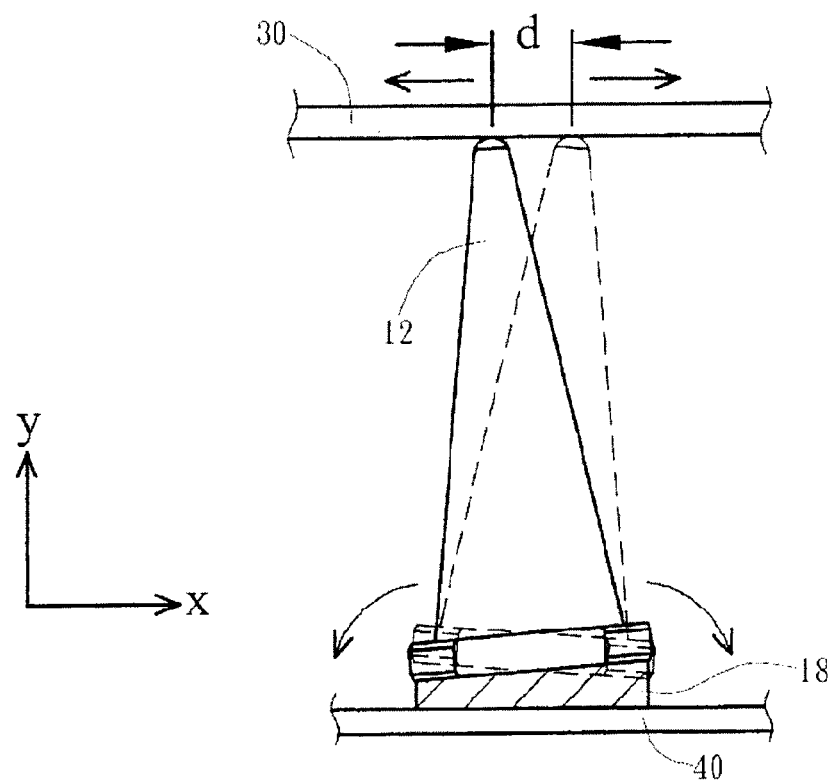
FIG. 1C is a schematic view of a conventional backlight module.
Figure 2A:
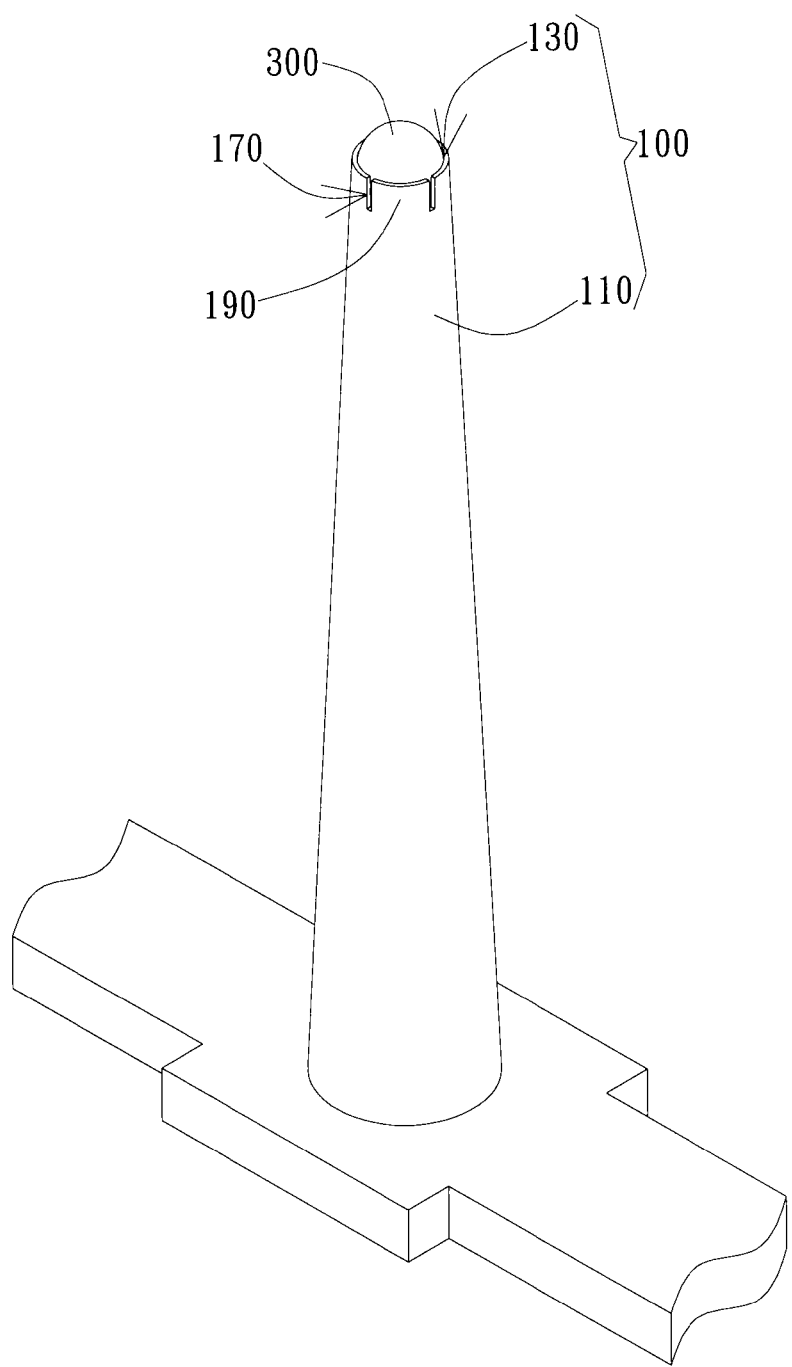
FIG. 2A is a schematic view of the film support of the present invention.
Figure 2B:
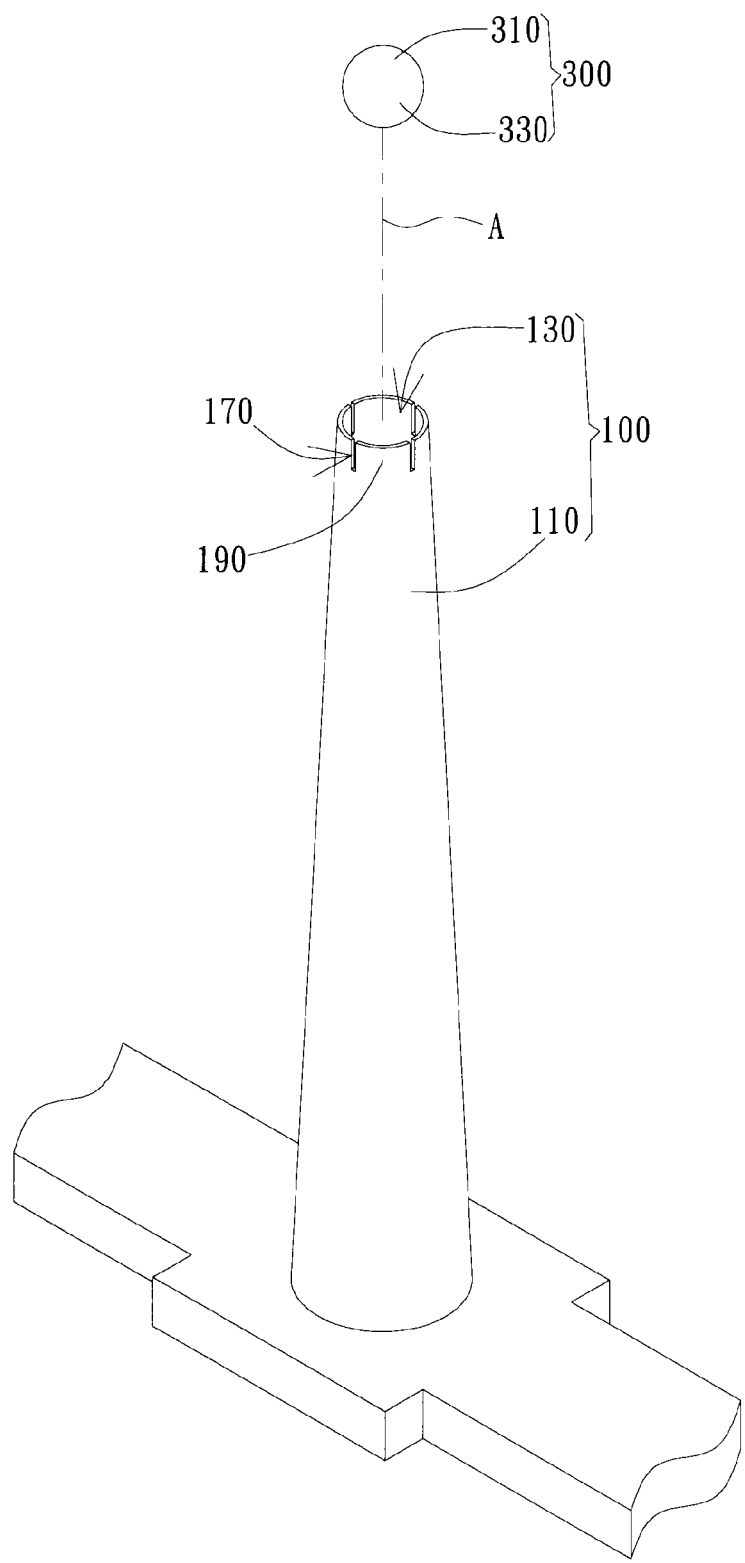
FIG. 2B is a disassembly view of the film support illustrated in FIG. 2A.

As FIG. 2A and FIG. 2B show, the present invention provides a film support, including a pillar 100 and a supporting unit 300. The pillar 100 has an outer wall 110 and an accommodation space 130 enclosed by the outer wall 110. The supporting unit 300 has a supporting end 310 and an assembly portion 330, wherein the assembly portion 330 is disposed in the accommodation space 130 and the supporting end 310 protrudes outside the pillar 100. The assembly portion 330 of the supporting unit 300 has a degree of freedom of rotation within the accommodation space 130. When the assembly portion 330 rotates with respect to the pillar 100, the supporting end 310 is correspondingly driven to rotate with respect to the pillar 100. In the embodiment illustrated in FIG. 2A and FIG. 2B, the pillar 100 preferably has a cone shape. The supporting unit 300 is preferably a sphere so that the supporting unit 300 in sphere shape can rotate around the axis of the pillar 100 or other axes. Furthermore, the top of the outer wall 110 of the pillar 100 has a plurality of notches 170 and those notches 170 divide the top of the outer wall 110 into a plurality of sections 190 to facilitate the accommodation of the assembly portion 330 of the sphere-shaped supporting unit 300. When the supporting unit 300 is assembled with the pillar 100, the assembly portion 330 of the supporting unit 300 is inserted from the top of the outer wall 110 and forces the top of the outer wall 110 to expand due to the notches 170 so as to enter the accommodation space 130. When the assembly portion 330 enters and is received in the accommodation space 130, the top of the outer wall 110 will return to its original shape to clamp the supporting unit 300.

Figure 2C:
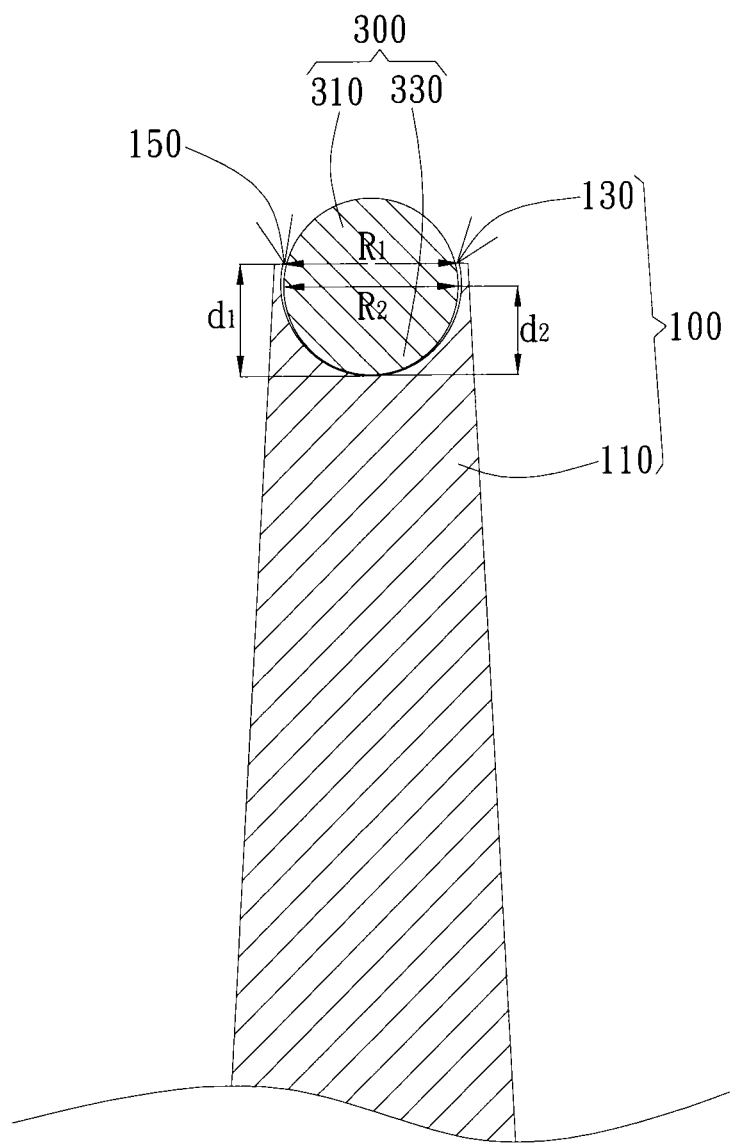
FIG. 2C is a cross-sectional view of the film support illustrated in FIG. 2B.

As FIG. 2C shows, the accommodation space 130 of the pillar 100 is a spherical space, wherein the supporting unit 300 corresponding to the accommodation space 130 is formed as a sphere so that the supporting unit 300 can be rotatably disposed in the accommodation space 130. In the present embodiment, the supporting unit 300 in sphere shape preferably occupies at least one half of the accommodation space 130, i.e. the size of the supporting end 310 is smaller than the size of the assembly portion 330. The supporting unit 300 is preferably made of elastic material such as plastics, rubber, or other similar materials. In the embodiment illustrated in FIG. 2A, FIG. 2B, and FIG. 2C, the top of the outer wall 110 of the pillar 100 encloses a mouth 150 whereas the diameter R1 of the mouth 150 is smaller than the diameter R2 of the supporting unit 300 in sphere to restrain the supporting unit 300. The depth d1 from the mouth 150 into the accommodation space 130 is greater than a radius d2 of the sphere shaped supporting unit 300.

Figure 3A:
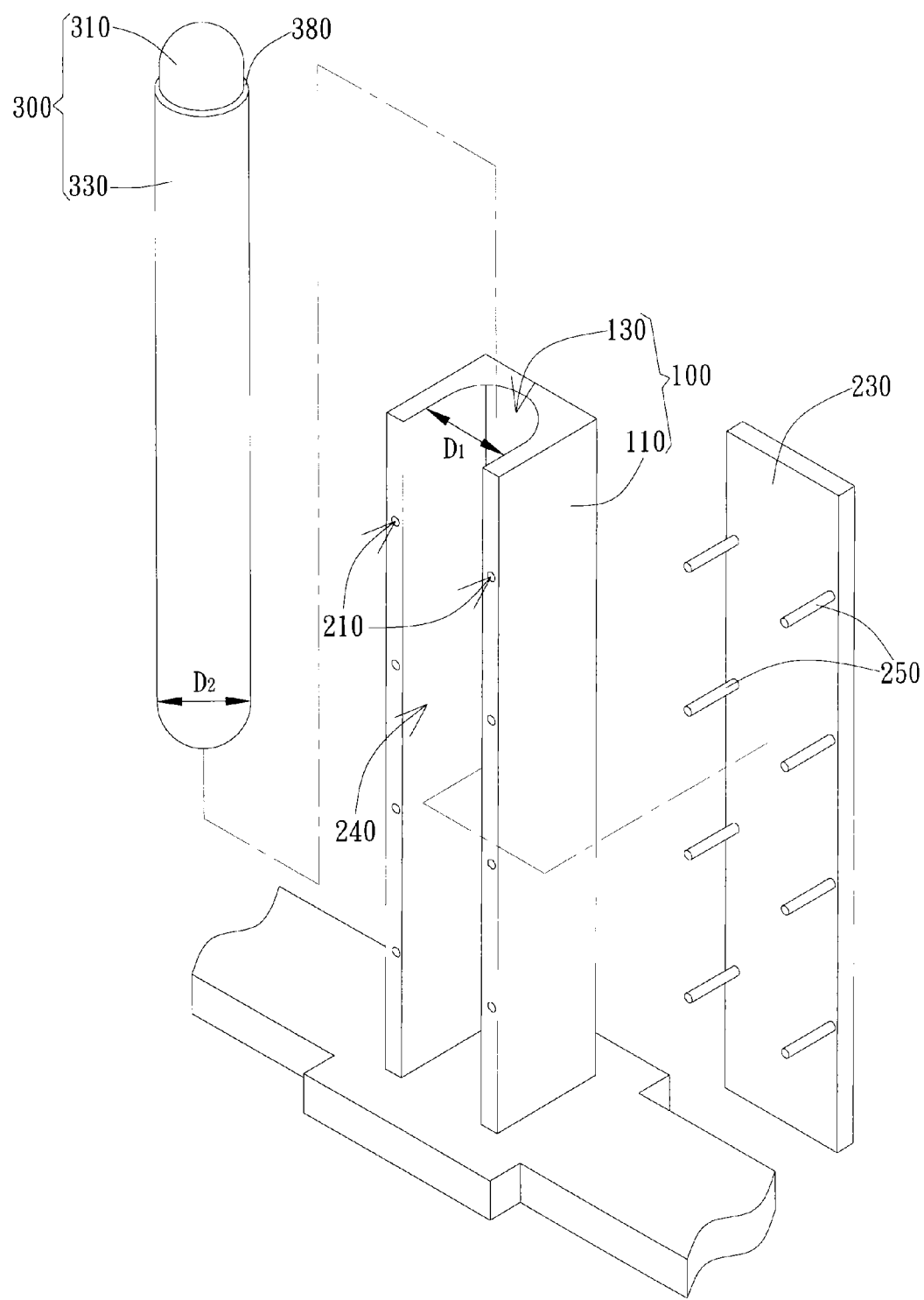
FIG. 3A is a disassembly view of the film support of another embodiment of the present invention.
Figure 3B:
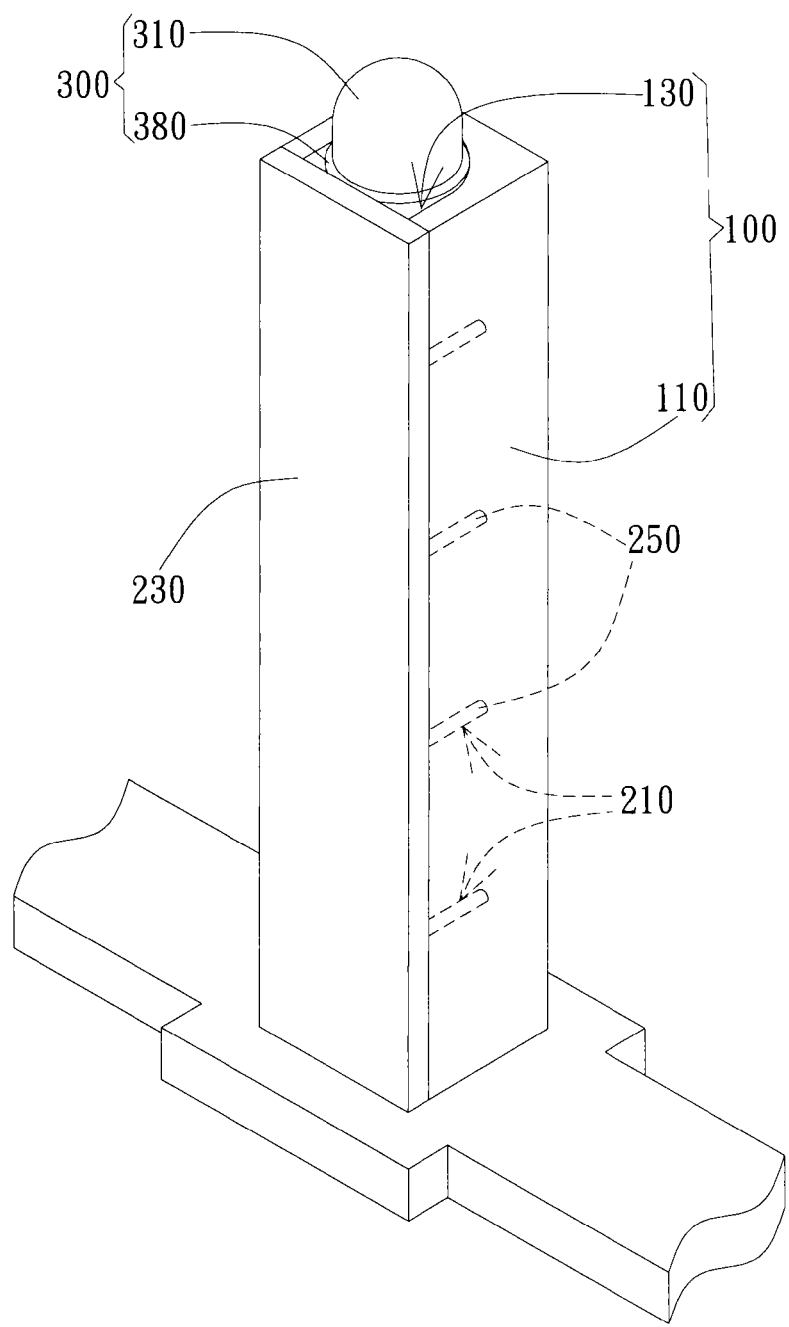
FIG. 3B is an assembly view of the film support illustrated in FIG. 3A.
Figure 3C:
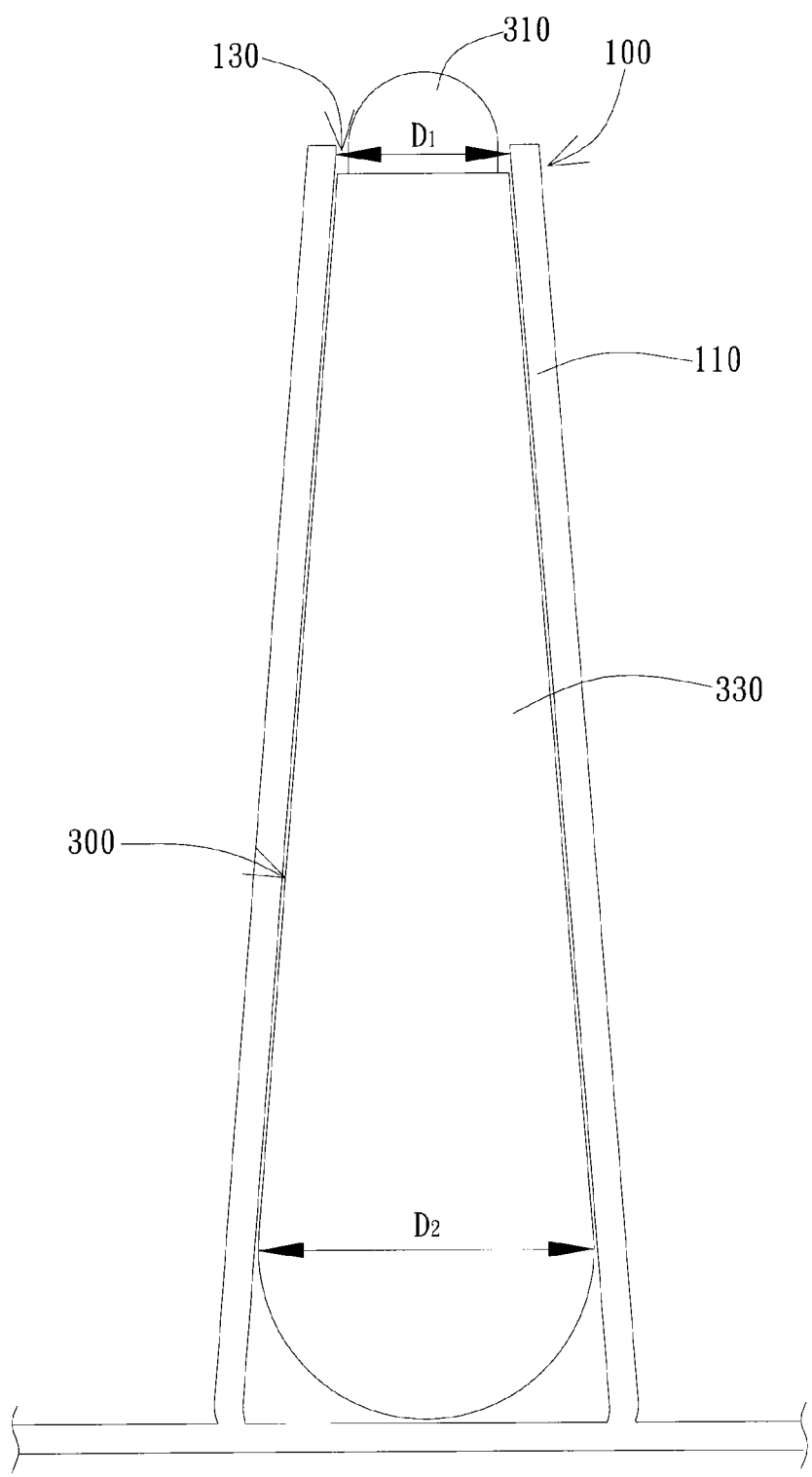
FIG. 3C is a cross-sectional view of the film support illustrated in FIG. 3A.

In another embodiment, as FIG. 3A and FIG. 3B show, the assembly portion 330 of the supporting unit 300 is rod-shaped and the accommodation space 130 of the pillar 100 is also a rod-shaped space corresponding to the assembly portion 330, wherein the rod-shaped assembly portion 330 can be rotatably disposed in the rod-shaped accommodation space 130. In other words, when the supporting end 310 can rotate around the axial direction of the supporting unit 300, the assembly portion 330 of the supporting end 310 can rotate within the accommodation space 130. The inner diameter D1 of the mouth of the accommodation space 130 is preferably equal to the diameter D2 of the bottom of the rod-shaped assembly portion 330 so that the assembly portion 330 can be fitted in the accommodation space 130. However, in the embodiment illustrated in FIG. 3C, the inner diameter D1 of the mouth of the accommodation space 130 can be modified to be smaller than the diameter D2 of the bottom of the rod-shaped assembly portion 330. As FIG. 3C shows, the assembly portion 330 is a cone rod and the accommodation space 130 is a cone-shaped space corresponding to the assembly portion 330.

Furthermore, as FIG. 3A and FIG. 3B show, the pillar 100 further includes a cover 230 whereas a lateral opening 240 is formed on the outer wall 110. The cover 230 is detachably coupled with the outer wall 110 to cover the lateral opening 240 so that the outer wall 110 and the cover 230 together enclose the accommodation space 130. In the embodiment illustrated in FIG. 3A and FIG. 3B, a plurality of insertion portions 250 are formed on one side of the cover 230 and a plurality of receiving portions 210 corresponding to the insertion portions 250 are disposed on one side of the outer wall 110 adjacent to the lateral opening 240. As such, when the insertion portions 250 are respectively inserted into the receiving portions 210, the cover 230 is coupled with the outer wall 110 to form the accommodation space 130 of the pillar 100.

Figure 4B:
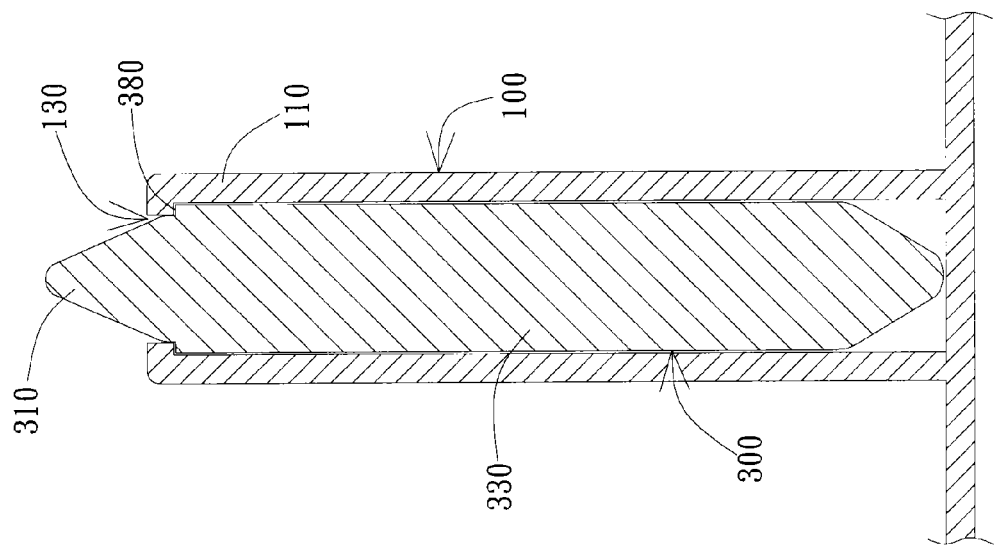
FIG. 4B is a schematic view of the supporting unit in another embodiment of the present invention.
Figure 4A:
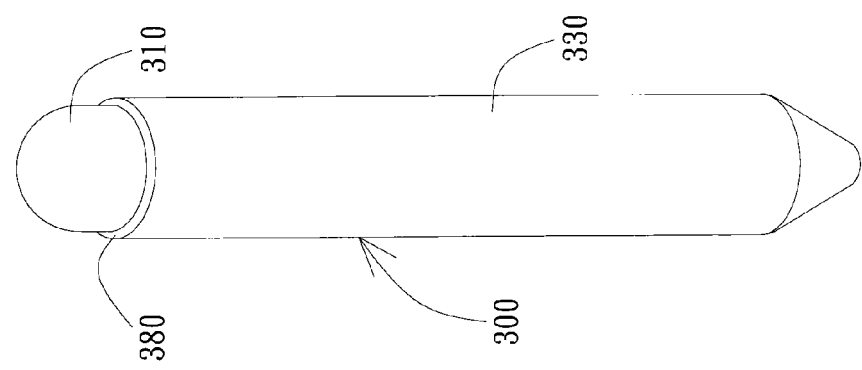
FIG. 4A is a schematic view of the supporting unit in one embodiment of the present invention.
Figure 4C:
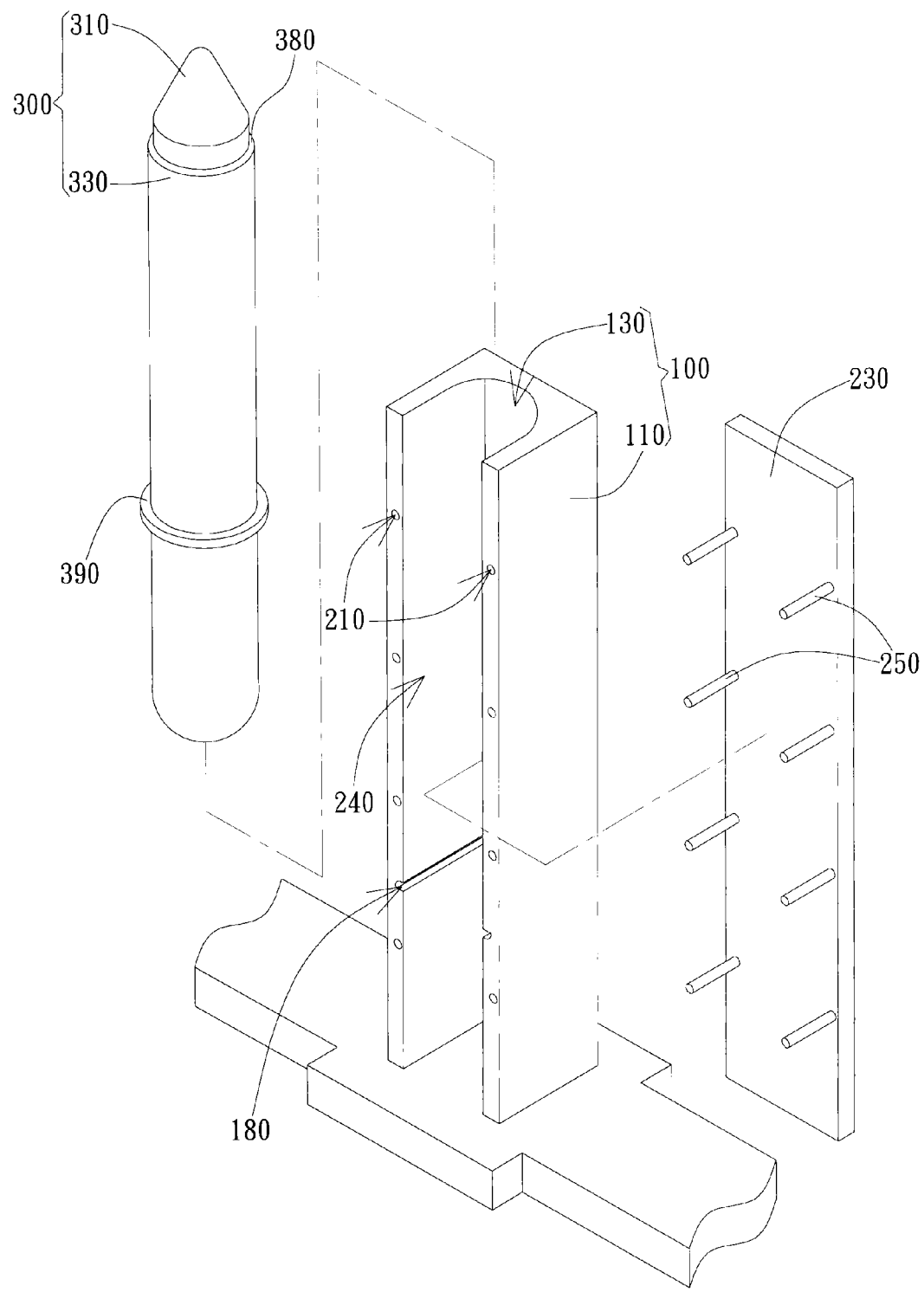
FIG. 4C is a schematic view of the supporting unit in yet another embodiment of the present invention.

Please refer to FIG. 4A, FIG. 4B, and FIG. 4C, the rod-shaped supporting unit 300 includes a variety of designs. For instance, the supporting end 310 can include a cylinder with rounded end or a cone, but is not limited thereto. The bottom of the assembly portion 330 can be arc-shaped, sphere-shaped, cone-shaped, or a combination thereof. However, in different embodiments, the supporting end 310 can be a triangular cone or have other suitable shapes. As FIG. 4A shows, the supporting end 310 contracts in a radial direction of the assembly portion 330 and the joint of the assembly portion 330 and the supporting end 310 forms a flange 380. In the embodiment illustrated in FIG. 4B, the top of the outer wall 110 of the pillar 100 extends toward the center of the accommodation space 130 and interferes with the flange 380 to limit the displacement of the supporting unit 300 in the accommodation space 110 of the pillar 100. Furthermore, please refer to FIG. 4C for another embodiment of restraining the supporting unit 300 in the accommodation space 130. A circular guiding slot 180 is formed on the inner surface of the outer wall 110 defining the accommodation space 130 and a circular rib 390 is formed on the assembly portion 330 to be engaged with the circular guiding slot 180, wherein the shape of the circular guiding slot 180 and the shape of the circular rib 390 correspond to each other but are not limited to be rectangular or circular. However, in different embodiments, the circular guiding slot 180 and the circular rib 390 can be disposed interchangeably based on design requirements.

Figure 5A:
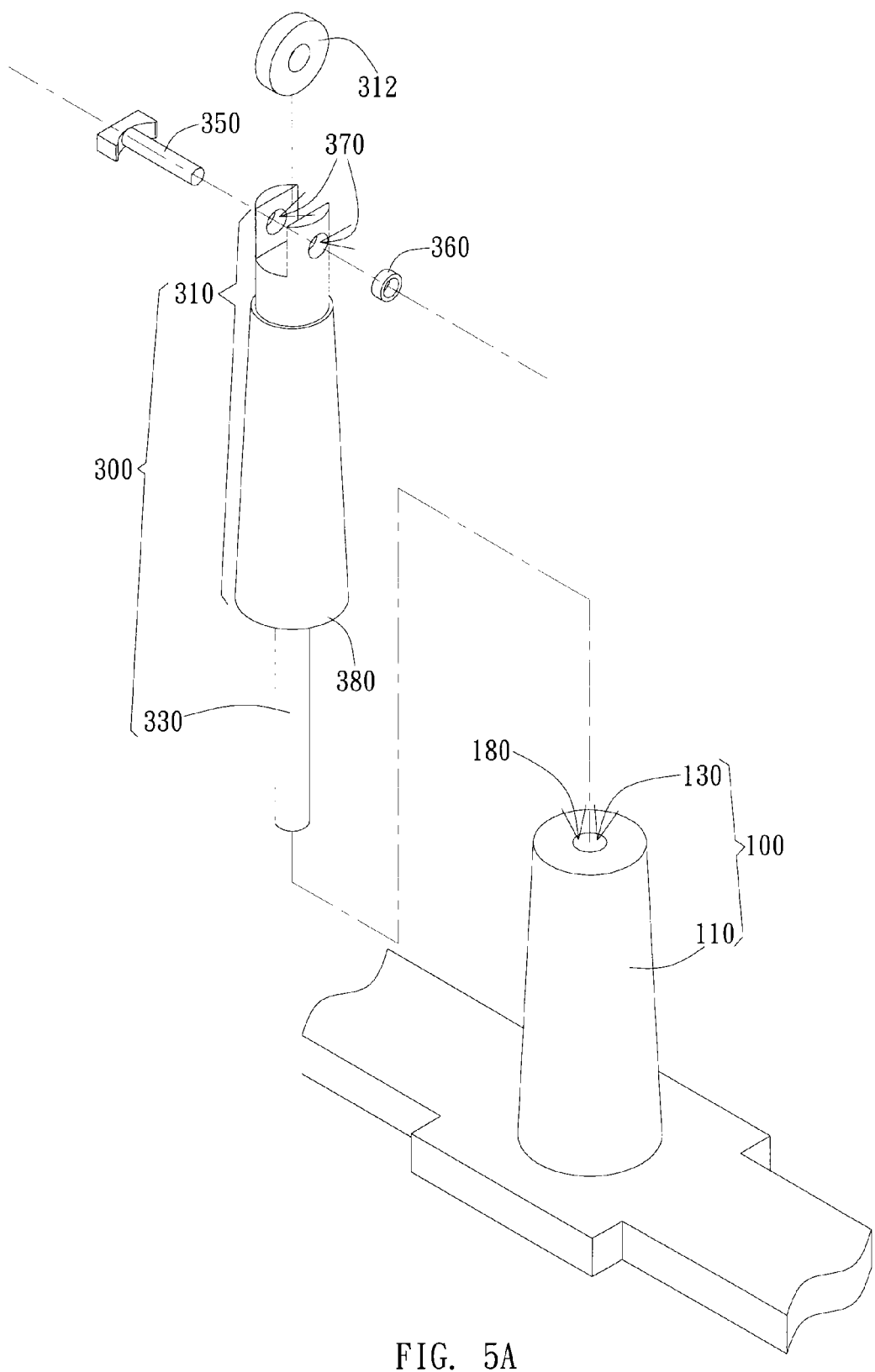
FIG. 5A is a disassembly view of the film support in another embodiment of the present invention.
Figure 5B:
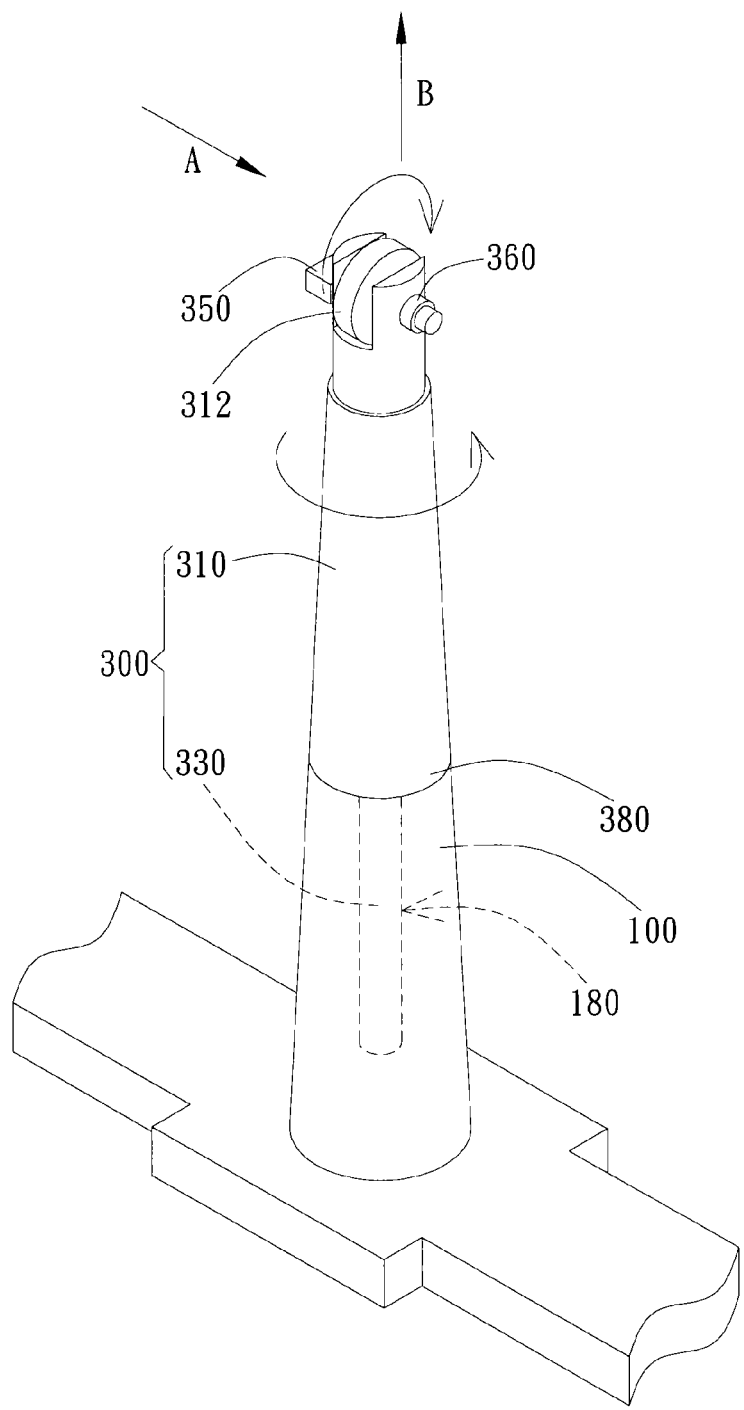
FIG. 5B is an assembly view of the film support illustrated in FIG. 5A.

In the embodiment illustrated in FIG. 5A and FIG. 5B, the assembly portion 330 is rod-shaped and the accommodation space 110 is also a rod-shaped space 130 corresponding to the assembly portion 330. In the present embodiment, the supporting end 310 further includes an assembly element 350 passing through a roller 312 and an assembly through-hole 370, wherein a fixing part 360 is coupled with the end of the assembly element 350. The above-mentioned assembly element 350 and the fixing part 360 preferably include bolts, nuts, or other similar elements. The roller 312 rotates around a first axis A whereas the first axis A is perpendicular to the axial direction of the assembly portion 330. The assembly portion 330 can rotate around a second axis B whereas the second axis B is the axial direction of the pillar 100 and is perpendicular to the first axis A. However, in different embodiments, the roller 312 may include a ball, a cylinder, or other suitable elements.

Furthermore, in the embodiment illustrated in FIG. 5A and FIG. 5B, the bottom of the supporting end 310 protrudes out of the radial width of the assembly portion 330, wherein the joint of the supporting end 310 and the assembly portion 330 forms a flange 380. The flange 380 comes in contact with the top of the outer wall 110 of the pillar 100 when the supporting unit 300 is assembled with the pillar 100. The supporting end 310 and the outer wall 110 of the pillar 100 together form a cone.

In yet another embodiment illustrated in FIG. 6, the supporting unit 300 is a hollow cylinder to be disposed around the top of the outer wall 110 of the cone-shaped pillar 100. However, in different embodiments, the supporting unit 300 can be disposed around the top of the outer wall 110 of a cylinder-shaped pillar 100. The shape of the supporting unit 300 can be selectively modified to correspond to the shape of the top of the pillar 100. In the present embodiment, glue or double-side adhesive is applied on the inner surface of the supporting unit 300 in order for the supporting unit 300 to be fixed on top of the outer wall 110 of the pillar 100.

Figures 6A, 6B:
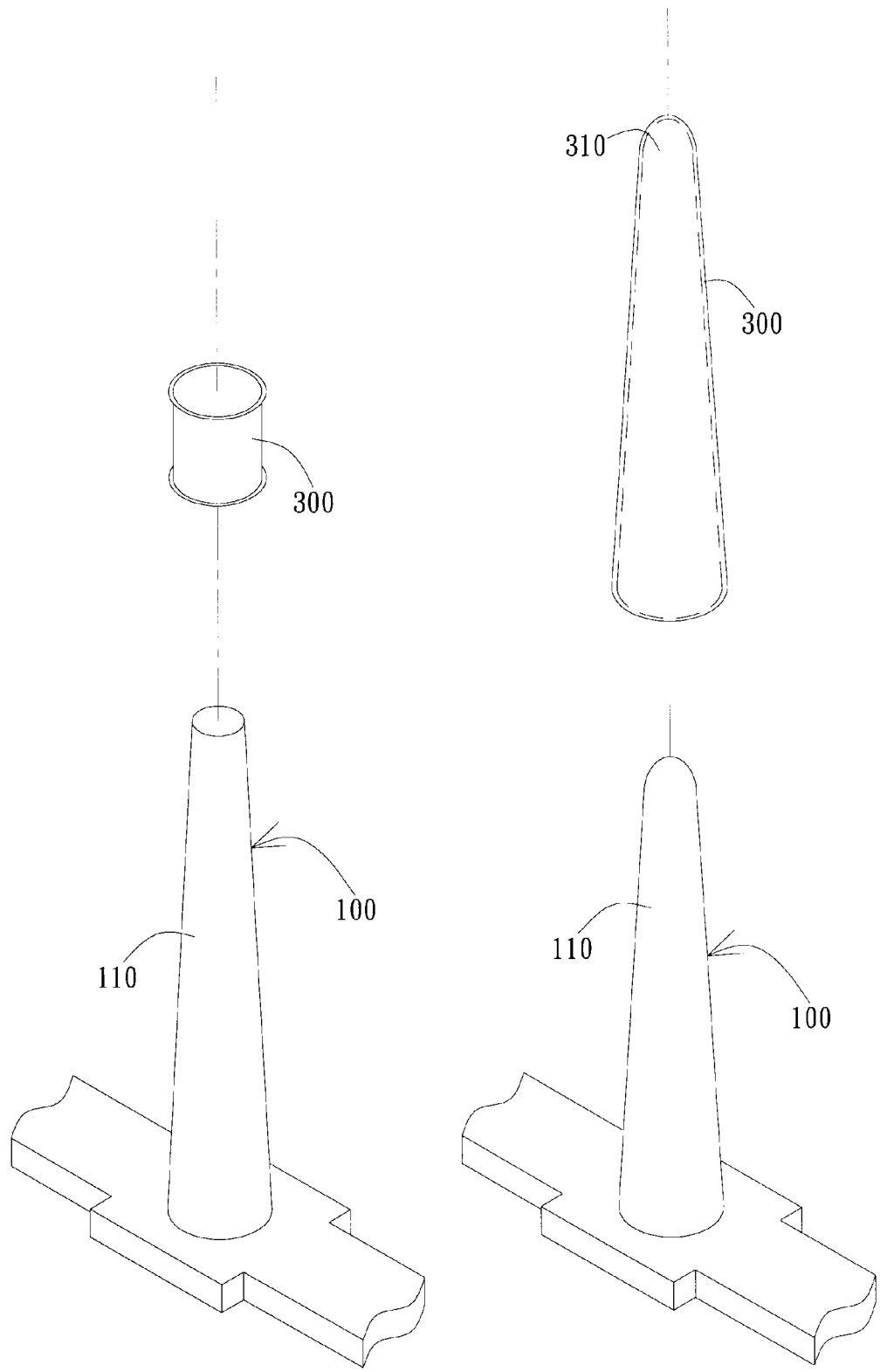
FIG. 6A is a schematic view illustrating a film support in the fourth embodiment of the present invention.
FIG. 6B is a schematic view illustrating a film support in the fifth embodiment of the present invention.

In the embodiment illustrated in FIG. 6B, the supporting unit 300 is a hollow cone to be disposed around the outer wall 110 of the corresponding pillar 100. The shape of the hollow supporting unit 300 can be modified based on the shape of the outer wall 110 of the pillar 100. Furthermore, if the top of the pillar 100 is formed as a cylinder or a cone, then the top of the supporting unit 300 will be accordingly shaped. The inner diameter of the mouth at one end of the supporting unit 300 is slightly greater than the outer diameter of the bottom of the outer wall 110 of the pillar 100 in order for the supporting unit 300 to be coupled with the outer wall 110 of the pillar 100.

It is noted that the supporting unit 300 in the embodiments described above is preferably made of elastic or soft materials such as rubber, plastics, polyurethane, silicon, or other similar materials. For the supporting unit 300 having the supporting end 310 and the assembly portion 330, the above-mentioned materials especially refer to the material used for the supporting end 310. On the other hand, the material for the pillar 100 and the assembly portion 330 includes but is not limited to plastics.

Figure 7A:
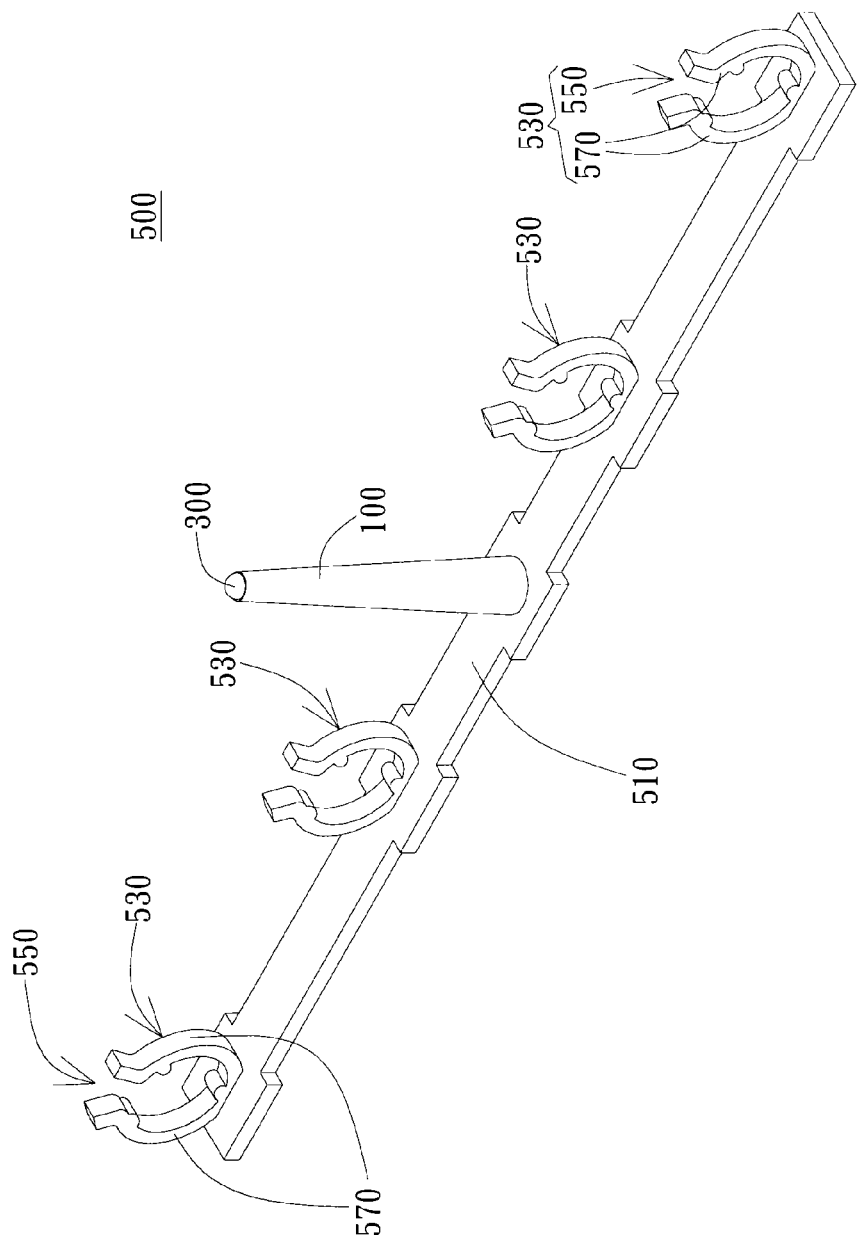
FIG. 7A is a schematic view of a lamp support of the present invention.
Figure 7B:
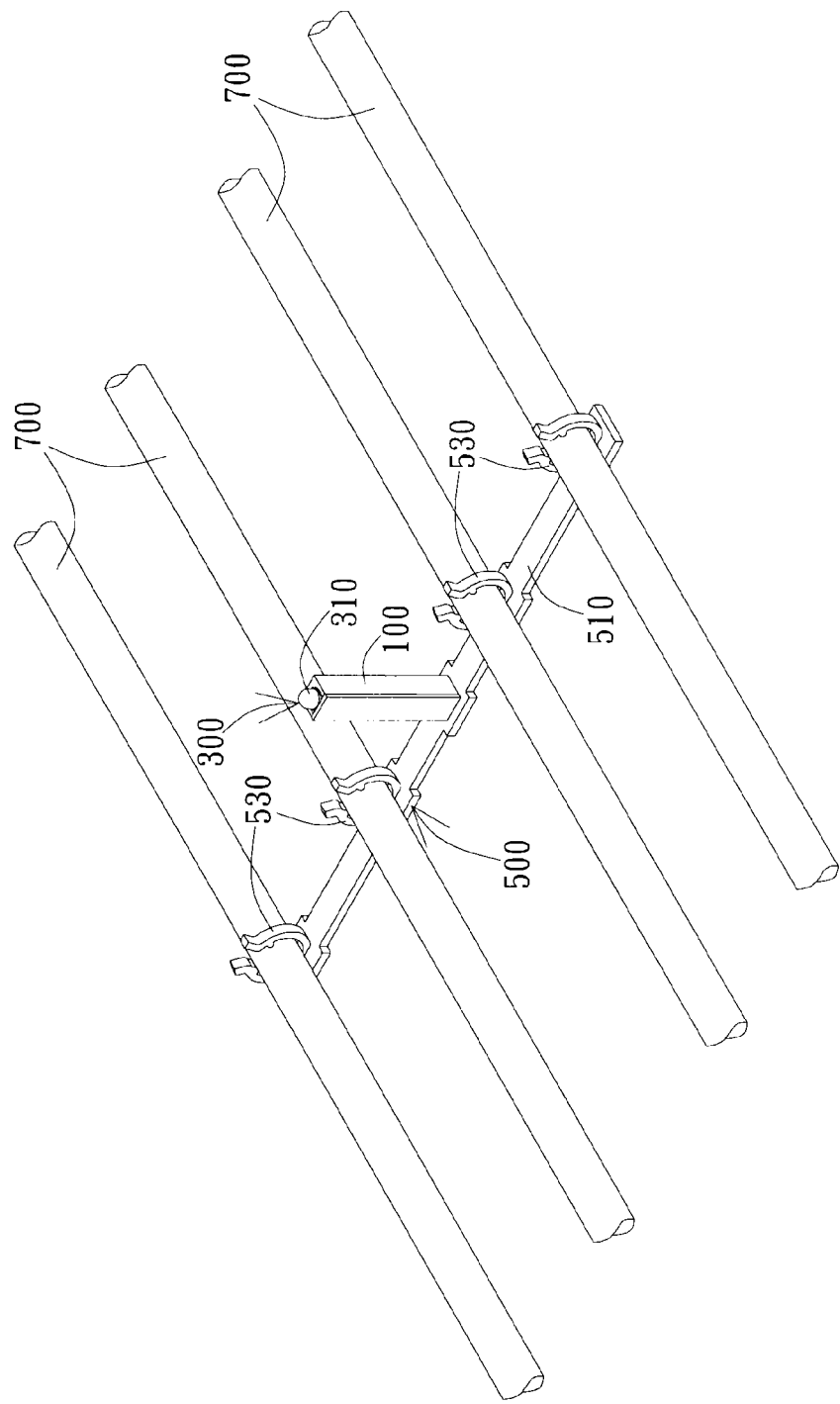
FIG. 7B is a schematic view illustrating the lamp support of the present invention assembled with lamps.

As FIG. 7A and FIG. 7B show, the present invention further provides a lamp support 500 including a base 510, a plurality of lamp positioning units 530, and the film support 100 from the embodiments described above. The lamp positioning units 530 are disposed on the strip-shaped base 510 while the film support 100 is disposed between the lamp positioning units 530. In the embodiments illustrated in FIG. 7A and FIG. 7B, the lamp positioning unit 530 is composed of two coupling portions 570 having an insertion mouth 550 located therebetween, wherein the two coupling portions 570 can move relative to the insertion mouth 550. The insertion mouth 550 is formed at a location opposite to the base 510 and therefore the lamp 700 can be disposed between or detached from the two coupling portions 570 through the insertion mouth 550.

The above-mentioned lamps 700 are preferably cold cathode fluorescent lamps (CCFL). However, in different embodiments, the lamps 700 also include other fluorescent lamps, or other types of long lamp tubes. The pillar 100 of the film support 100 is fixed on the base 510 and the supporting unit 300 can rotate with respect to the base 510 to support objects such as an optical sheet (not illustrated). The film support 100 and the pillar 100 preferably form a unibody. In the embodiments illustrated in FIG. 7A and FIG. 7B, the film support 100 is preferably disposed at the centre of the base 510 of the lamp support 500. However, the number and location of the pillar 100 and the number and location of the lamp support 500 can be modified based on the size of the object to be supported. Furthermore, the structure and embodiments of the film support 100 have been described above and therefore will not be elaborated here.

Figure 8:
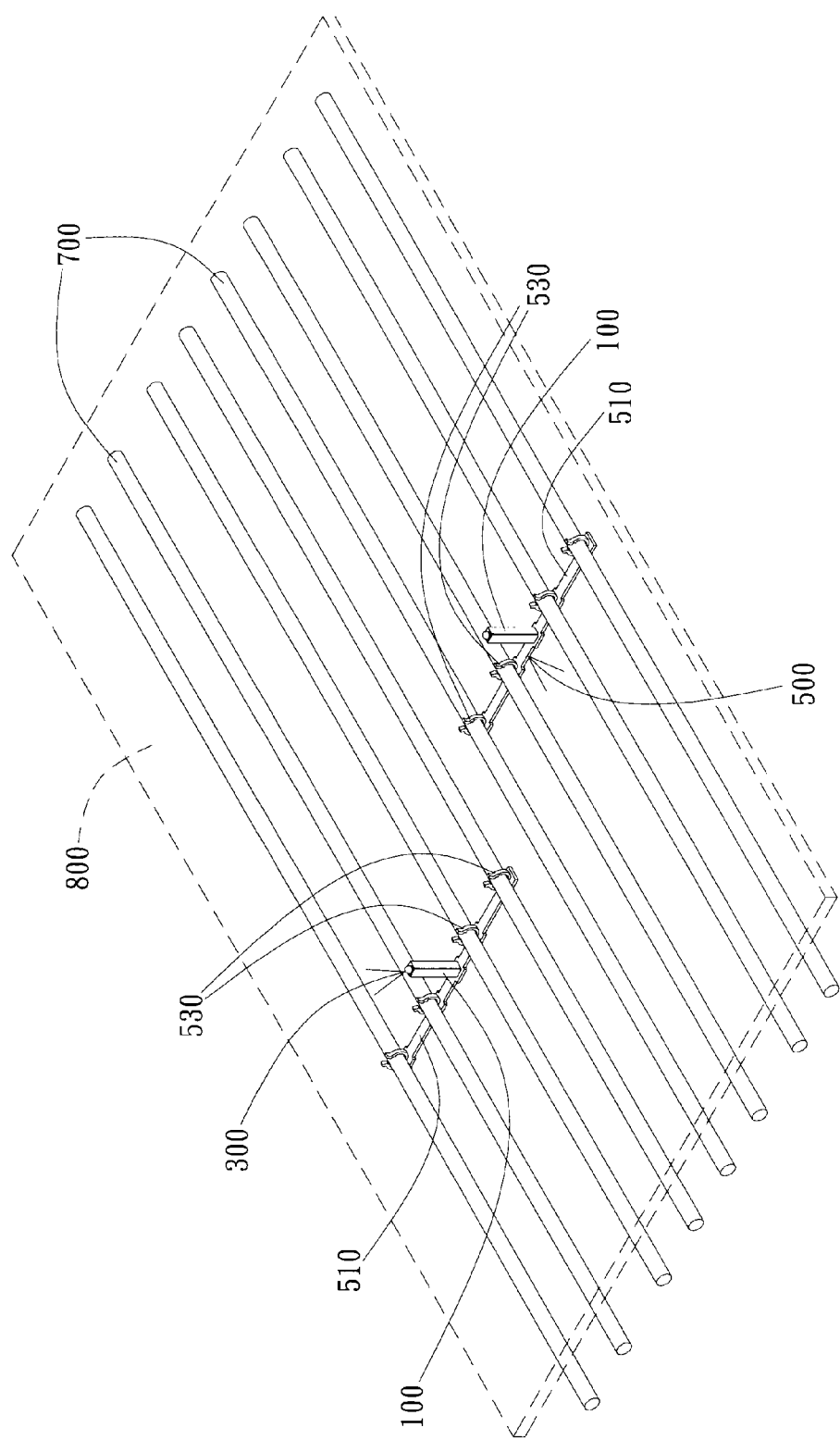
FIG. 8 is a schematic view of the backlight module of the present invention.

FIG. 8 is a schematic view of the backlight module of the present invention. As FIG. 8 shows, the backlight module of the present invention includes a plurality of lamps 700, at least one optical sheet 800, the lamp support 500 including a film support 100 mentioned above. The optical sheet 800 is disposed above the lamp support 500 and the lamps 700. The optical sheet 800 preferably refers to a light diffusion film; however, in different embodiments, the optical sheet 800 may include hybrid optical films, other types of optical films, or even supporting sheets used in other technologies such as molding or transportation.

Figure 9:
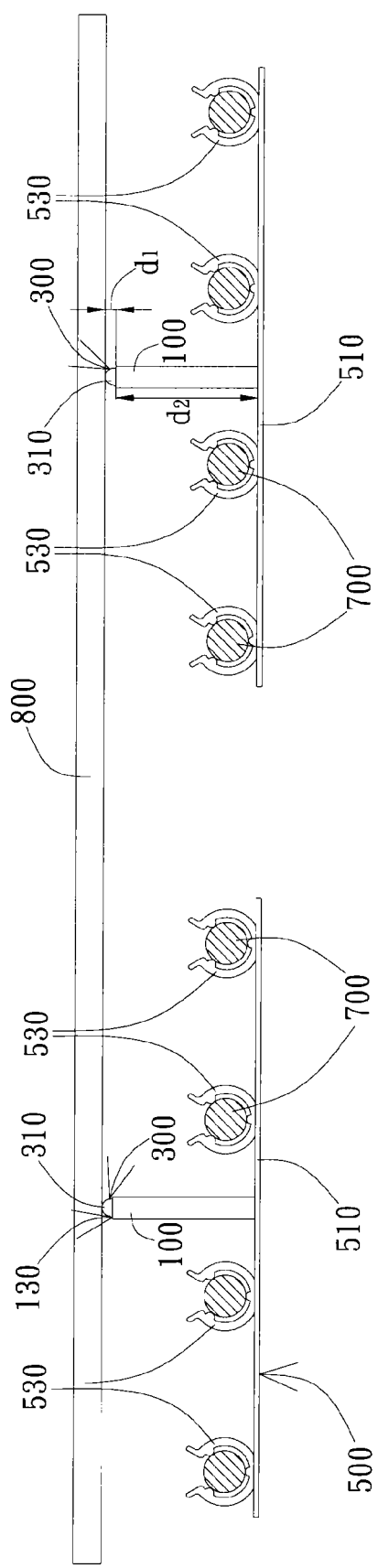
FIG. 9 is a side view of the backlight module illustrating in FIG. 8.

FIG. 9 is a cross-sectional view of the backlight module illustrated in FIG. 8. In the present embodiment, the optical sheet 800 is supported by the supporting units 300 assembled with the pillars 100 of the film supports and then positioned by a frame (not illustrated). When a reliability test or other tests are performed on the backlight module, the friction between the optical sheet 800 and the elastic or rotatable supporting end 310 does not damage the optical sheet 800 or other sheets. Furthermore, as FIG. 9 shows, the distance d1 between the optical sheet 800 and the supporting end 310 of the supporting unit 300 is preferably smaller than the length d2 of a portion of the assembly portion 330 that extends into the accommodation space 130. Such a design reduces the chance of the assembly portion 330 escaping from the accommodation space 130.

The above is detailed descriptions of the particular embodiments of the invention which is not intended to limit the invention to the embodiments described. It is recognized that modifications within the scope of the invention will occur to a person skilled in the art. Such modifications and equivalents of the invention are intended for inclusion within the scope of this invention.

What is claimed is:

1. A film support, comprising:
   a pillar having an outer wall enclosing an accommodation space; and
   a supporting unit having a supporting end and an assembly portion connected to each other, the assembly portion being disposed in the accommodation space and the supporting end protruding outside the pillar, wherein the assembly portion is at least partially surrounded by the pillar;
   wherein the assembly portion of the supporting unit has a degree of freedom of rotation within the accommodation space, and when the assembly portion rotates with respect to the pillar, the supporting end is driven to rotate with respect to the pillar.

2. The film support of claim 1, wherein the accommodation space is a spherical space, the supporting unit is formed as a sphere rotatably disposed in the accommodation space, a top of the outer wall of the pillar forms a mouth, a diameter of the mouth is smaller than a diameter of the sphere serving as the supporting unit for the mouth to limit the supporting unit.

3. The film support of claim 2, wherein a depth from the mouth into the accommodation space is greater than a radius of the sphere serving as the supporting unit.

4. The film support of claim 2, wherein the pillar has a cone shape.

5. The film support of claim 2, wherein the top of the outer wall of the pillar has a plurality of notches and the notches divide the top of the outer wall into a plurality of sections.

6. The film support of claim 1, wherein the assembly portion of the supporting unit is rod-shaped and the accommodation space is a rod-shaped space corresponding to the assembly portion, the rod-shaped assembly portion is rotatably disposed in the rod-shaped accommodation space.

7. The film support of claim 6, wherein a diameter of a mouth of the accommodation space is smaller than an external diameter of a bottom end of the rod-shaped assembly portion.

8. The film support of claim 7, wherein the assembly portion is a cone rod, the accommodation space is a cone-shaped space corresponding to the assembly portion.

9. The film support of claim 6, wherein the supporting end contracts in a radial direction of the assembly portion, a joint of the assembly portion and the supporting end forms a flange, a top of the outer wall of the pillar extends toward a centre of the accommodation space and interferes with the flange.

10. The film support of claim 6, wherein the supporting end protrudes out of a radial width of the assembly portion, a joint of the supporting end and the assembly portion form a flange for contacting a top of the outer wall of the pillar.

11. The film support of claim 6, wherein a circular guiding slot is formed on an inner surface of the outer wall defining the accommodation space, a circular rib is formed on the assembly portion to be engaged with the circular guiding slot.

12. The film support of claim 6, wherein the supporting end includes a roller rotating around a first axis, the first axis is perpendicular to an axial direction of the assembly portion.

13. The film support of claim 6, wherein the supporting end and the outer wall of the pillar form a cone.

14. The film support of claim 6, wherein the pillar includes a cover, a lateral opening is formed on the outer wall, and the cover is detachably coupled with the outer wall to cover the lateral opening, the cover and the outer wall enclose the accommodation space.

15. A lamp support, comprising:
   a base;
   a plurality of lamp positioning units disposed on the base; and
   at least one film support of claim 1 disposed between the plurality of the lamp positioning units.

16. The lamp support of claim 15, wherein the pillar is fixed on the base and the supporting unit rotates with respect to the base.

17. A backlight module, comprising:
   a lamp support, having:
      a base;
      a plurality of lamp positioning units disposed on the base; and
      at least one film support of claim 1 disposed between the plurality of the lamp positioning units;
   a plurality of lamps positioned on the lamp positioning units; and
   at least one optical sheet disposed above the lamp support and the lamps.

18. The backlight module of claim 17, wherein a distance between the optical sheet and the supporting end of the supporting unit is smaller than a length of a portion of the assembly portion within the accommodation space.

* * * * *